Figure 5:
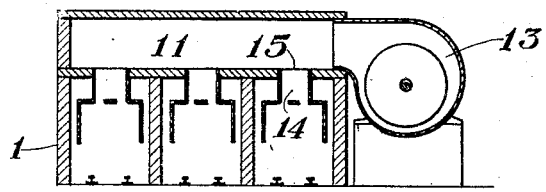

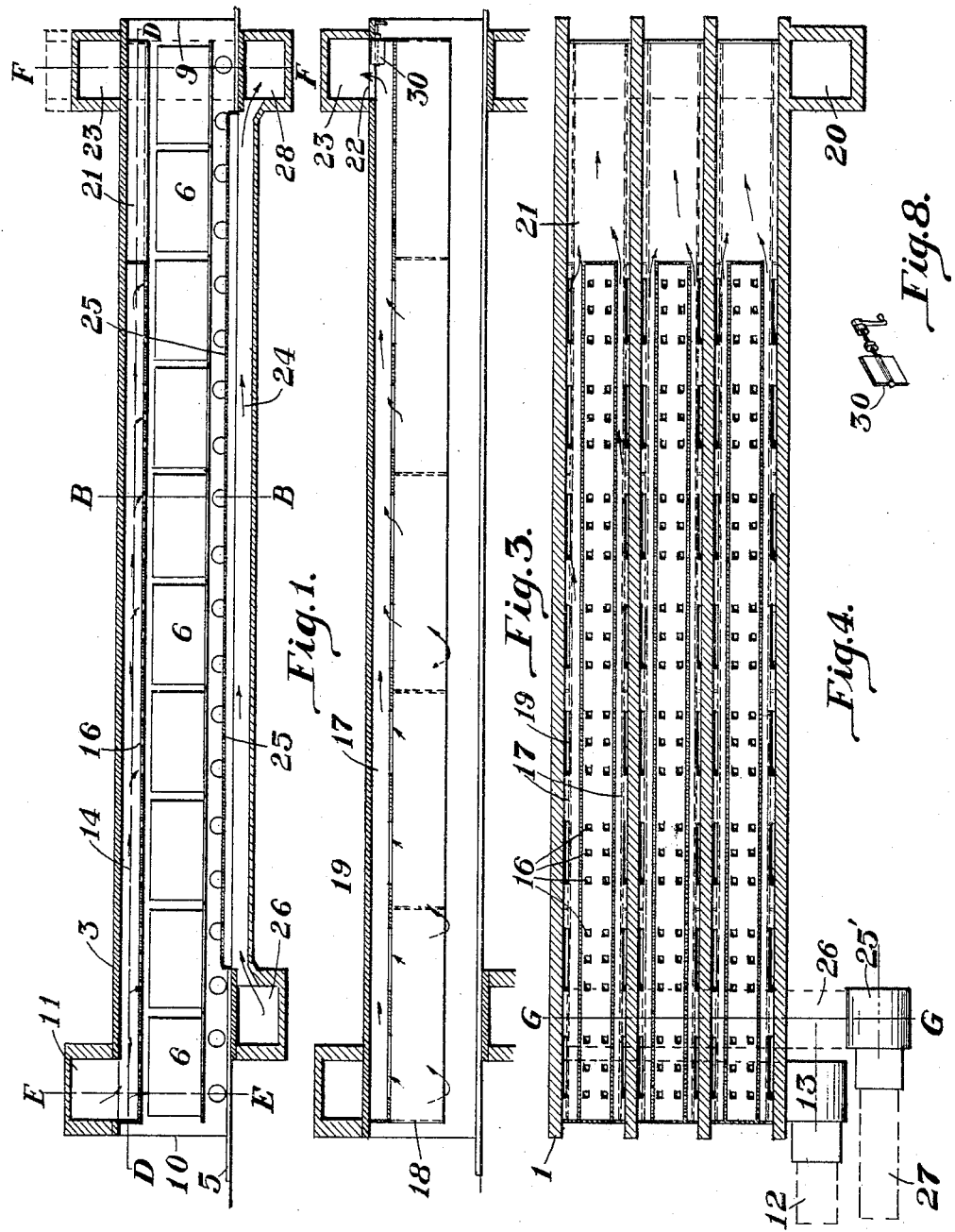

Feb. 14, 1933.  T. W. GARVE  1,897,387
TUNNEL DRIER
Filed April 29, 1930    2 Sheets-Sheet 2

INVENTOR.
T. Walter Garve
BY
ATTORNEYS.

Patented Feb. 14, 1933

1,897,387

UNITED STATES PATENT OFFICE

TREUMUND WALTER GARVE, OF COLUMBUS, OHIO

TUNNEL DRIER

Application filed April 29, 1930. Serial No. 448,362.

This invention relates to improvements in tunnel driers adapted for use in the drying of clay and other ceramic wares, and it is a primary object of the present invention to provide an efficient drier by which waste heat, obtained from kilns, or other high temperature burners, is utilized efficiently for the purpose of effecting a preliminary heating or drying of green ware before the latter is subjected to the final high burning temperatures which are employed in usual kiln operations.

It is another object of the invention to provide a tunnel drier which includes a masonry wall structure by which a longitudinal passage or enclosed tunnel is provided and through the base of which tunnel there extends a trackway over which a train of related cars is moved longitudinally through the tunnel and subjected to the drying temperatures prevailing therein. The cars, loaded with the ware to be dried, pass through this tunnel while heat obtained from a suitable source is applied thereto, the cars with the ware contained thereon being progressively advanced from the low temperature inlet end of the tunnel to the high temperature outlet end thereof, the distribution of the heat in the tunnel being such as to provide for the gradual heating of the green ware as the latter advances through the tunnel to avoid injury to the ware by reason of improper application of heat.

A further object of the invention resides in providing the upper portion of the tunnel above the cars and the ware supported thereon, with a longitudinally extending conduit having a perforate lower wall wherein provision is made for passing heated air through the conduit so that such heated air is delivered substantially downwardly on the ware throughout substantially the length of the tunnel, the temperature of the air at the inlet portion of the tunnel being higher than the temperature of the air in the tunnel at the outer end of the conduit so that a temperature gradient is present in the tunnel which increases from the car inlet to the car outlet end thereof.

A further object of the invention resides in providing the upper portion of the tunnel with depending aprons which extend longitudinally of the tunnel and serve in conjunction with the air inlet conduit to provide longitudinally extending exhaust conduits along the sides of the wall structure, the entrance to said exhaust conduits being located in a horizontal plane appreciably below the lowest plane of the air delivering conduit so that the heated air delivered to the tunnel passes downwardly through the ware and then laterally and substantially horizontally across the lower portions of the ware resting on the cars or carriers prior to the delivery of the heated air to the exhaust conduits, whereby through the provision of the inlet and exhaust conduits a uniform circulation of the heated air across the ware being dried is secured so that not only is that portion of the ware located in the upper part of the tunnel subjected to an efficient drying operation but also that portion of the ware which is nearest the car platforms, and in this respect in particular the present invention provides an improvement upon earlier types of driers which have not been efficient in the matter of effecting a proper drying of all portions of the setting or ware mounted on car platforms.

A further object of the invention resides in providing the base of the tunnel between the car tracks with an enclosed longitudinally extending conduit through which are forced waste gases which are discharged from the burning or firing zones of an associated kiln in order that said waste gases may be efficiently utilized in the matter of heating the tunnel comprising the drier to supplement that heat which is directly applied by the heated air delivered to the tunnel through the overhead conduit, the heat from the waste combustion gases passing through the floor conduit is delivered to the tunnel through radiation rather than convection in order to protect the ware from impurities which may be present in the combustion gases.

With these and other objects in view which will appear as the description proceeds, the invention consists in novel features of construction, combinations of elements and arrangements of parts hereinafter to be fully described and pointed out in the appended claims.

Figure 6:
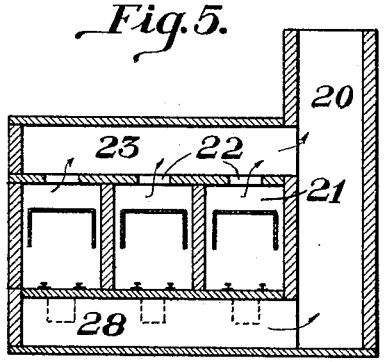
Figure 7:
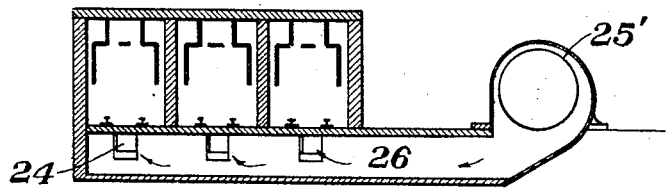
Figure 2:
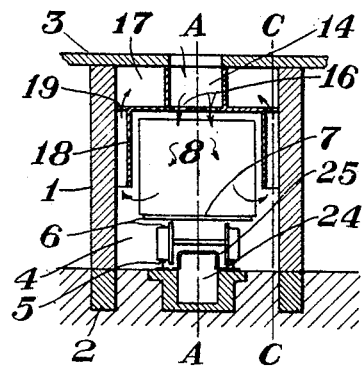

In the accompanying drawings:

Figure 1 is a vertical longitudinal sectional view taken through the central portion of a drier constructed in accordance with the present invention on the line A—A of Figure 2, Figure 2 is a transverse sectional view taken through the drier on the plane indicated by the line B—B of Figure 1, Figure 3 is a vertical longitudinal sectional view taken through the drier on the plane indicated by the line C—C of Figure 2, Figure 4 is a horizontal sectional view taken through the drier on the line D—D of Figure 1, Figure 5 is a transverse sectional view taken through the drier on the line E—E of Figure 1, Figure 6 is a similar view on the line F—F of Figure 1, Figure 7 is a vertical section on the line G—G of Figure 4, and Figure 8 is a perspective view of the adjustable damper used in the drier.

Referring more particularly to the drawings, my improved drier comprises a wall structure of suitable material, usually of masonry construction. In this instance there is provided a plurality of spaced longitudinally extending vertical walls 1 which rest upon a base 2 and are provided with a substantially flat crown or roof structure 3. These walls produce a plurality of spaced longitudinally extending passages or tunnels 4 which extend through the drier from one end of the latter to the other. These tunnels may be of any suitable length or proportions depending upon the particular products which are heat treated therein. In each tunnel a base is provided with a longitudinally extending trackway 5 and over these trackways cars 6 are moved in trains. Ordinarily, these cars are provided with flat platforms 7 on which the green ware 8 to be dried is placed to form the usual settings. The cars are advanced intermittently or continuously from the low temperature inlet end 9 of each tunnel toward the high temperature outlet end 10 thereof, and as the ware is moved longitudinally through the tunnel, as indicated, it encounters progressively higher temperatures until a desired drying temperature is attained which may be of the order of 150° to 200° F. or higher. By gradually increasing the temperature of the ware in this manner injury to the ware through sudden heating is avoided and loss of ware is correspondingly minimized.

At the car discharge end 10 of the drier there is formed a transversely extending duct 11 which is located above the roof structure 3. This duct communicates with a flue 12 and a circulating fan 13 which effects the forced passage therethrough of heated air which has been discharged as a waste product from the cooling zones of high temperature burning kilns (not shown) or in certain instances from cooling kilns per se. Usually, this heated air possesses a temperature which even after it is discharged from the cooling kiln or a cooling zone of a kiln, is adequate to heat the drier comprising the present invention, although it is within the scope of the present invention to employ heated gases or air obtained from any other source of supply, and I suggest the use of waste products from associated kilns merely as a matter of economy in the effective utilization of developed heat rather than as a limitation with regard to the various embodiments of the present invention.

Extending longitudinally of each of the tunnels 4 and arranged in the center thereof immediately contiguous to the roof or crown structure 3, is a conduit 14. As shown in Figure 5, each of these conduits at one end thereof is in open communication with the duct 11 so that heated air will be forced through each of the conduits by the operation of the fan 13 throughout the length thereof. The roof structure is provided with an opening 15 above each tunnel which establishes communication between the conduit 14 and the duct 11. The conduit 14 may be formed from any desired material but is preferably constructed from thin asbestos containing composition board or any other material capable of conducting and radiating heat. As shown particularly in Figures 1 and 4, the lower walls of each conduit 14 are perforated as at 16 which allows the heated air to travel longitudinally through each conduit and pass downwardly and directly into the associated tunnel 4, where the heated air contacts directly with the ware positioned on the cars 6. As the heated air passes longitudinally through the conduits from the inlet toward the outlet ends thereof, it meets and passes through smaller openings or slots by which the tunnel below gradually loses temperature so that the car outlet end 10 of each tunnel possesses a higher temperature than the car inlet end thereof.

Disposed on both sides of the conduit 14 is a longitudinally extending exhaust conduit 17. These conduits are also arranged in the roof of the tunnel and are provided at their sides with depending walls or aprons 18. The latter are spaced from the vertical side walls of the tunnels 4 and terminate a short distance above the platform 7 of the car 6. By this arrangement it will be seen that the heated air delivered to each of the tunnels 4 from its conduit 14 first travels downwardly when entering the tunnel, utilizing thereby the down draft principle of circulation. The heated air after traveling downwardly then spreads laterally and horizontally, as shown in Figure 2, and is finally discharged from each tunnel section by passing upwardly between the aprons 18 and the side walls of the tunnel, the discharge air entering the exhaust ducts 17 through the slots or perforations 19 and then passing longitudinally through each of the exhaust conduits 17 toward the car inlet end of the drier, this moisture laden spent air being delivered to an atmospheric exhaust stack 20. Adjacent to the stack 20 the exhaust conduits 17 are widened so as to extend entirely across the full width of each of the tunnels 4. This is made possible since the conduits 14 terminate within the tunnels and at positions spaced from the car inlet ends 9 thereof. These widened portions 21 of the conduits 17 communicate with ports 22 formed in the roof structure of the drier and which ports establish communication between the widened portions 21 of the conduit and the cross duct 23, which leads to the stack 20, the cross duct being disposed over the roof structure of the drier.

In addition to the above, the drier is heated by a longitudinally extending duct 24 formed separately in the base 2 of each of the tunnels. The upper portion of each duct is closed by a heat radiating cover plate 25. The ducts 24 communicate, as shown in Figure 7, adjacent to the car outlet end of the drier with a transversely extending supply duct 26 which passes below the wall structure 1 and communicates in common with each of the ducts 24. At its open end the duct 26 is provided with a fan 25' which communicates with a flue 27 leading from a source of combustion gas supply. Ordinarily, in this connection I utilize the waste gases discharged from the burning or oxidizing zone of a high temperature kiln in the ducts 24. These waste gases when discharged from said zones still contain a considerable quantity of heat and the present invention permits this heat to be utilized for the pre-heating or drying of the green ware. Since these waste combustion gases contain certain impurities, the conduits or ducts 24 do not permit of the discharge of the gases passing therethrough directly into the tunnels 4 since this might injuriously affect the ware, and therefore the cover plate 25 is used which consists of a thin heat radiating material which serves to effectively transmit the heat contained in the gases passing through the ducts 24 to the tunnels 4 and the ware passing therethrough, this heat being used to augment that delivered to the ware by the operation of the conduits 14. It is to be understood, however, that if heated air passes through the ducts 24 the latter may be perforated in the same manner as the conduits 14. While I have shown the duct 24 as being located in the center of each of the tunnels, it is also obvious that it may be positioned in other locations. After traversing the full length of the ducts 24, the waste combustion gases, at a low temperature, are delivered into a cross duct 28 located below the duct 23, and from the duct 28 the gases pass to the stack 20.

If desired, the area of the perforations 16 formed in the conduits 14 may be decreased towards the car intake end of the drier. Various types of outlets other than perforations may be utilized in connection with the conduits 14.

In view of the foregoing it will be seen that the present invention provides a drier of the continuous tunnel type which permits of the efficient utilization of the heat supplied thereto. The delivery and circulation of this heat through the ware receiving tunnels of the drier is such as to provide for the uniform heating of the ware passing through the tunnels, that is, not only the ware at the top and sides of the car setting but also that ware which is located near the car platforms and within the setting. This feature is secured by the down draft principle of circulation of heated air delivered from the roof conduits and also in part to the supplemental action of the base floor conduits. The ware is gradually heated as it passes through the tunnels and loss thereof due to cracking and similar causes is correspondingly reduced.

The openings 22 establishing communication between the conduit 17 and the cross duct 23 may be provided, as shown in Figures 3 and 8, with adjustable dampers 30 which when in closed positions partially obstruct the flow of gases through the openings 22. By the provision of these dampers the velocity of gas flow between the tunnels is governable. It will be observed that the drier is so constructed as to provide for the continuous passage of the heated air through the tunnel and into contact with the ware contained therein and is finally directly exhausted through the conduit 17 and the outlet stack. There is no recirculation of the heated gases as in previous types of driers, since by the provision of the novel principles of air flow above disclosed the air and gaseous products discharged through the stack is moisture laden and recirculation thereof through the tunnel would hardly prove efficient or effective, and I therefore prefer to use the direct flow of air through the tunnel from the inlet to the outlet ends thereof. The tunnel drier here disclosed is both simple and economical in construction and operation. The walls forming the conduits 14 and 17 within the tunnel are formed from standard fabricated materials and their installation, maintenance and repair can be effected at low cost. I, of course, do not limit myself to the specific features of construction and design above set forth, but reserve the right to employ such variations and modifications thereof as may be said to fall fairly within the scope of the following claims.

What is claimed is:

1. A drier for clay ware comprising a wall structure arranged to provide an elongated longitudinally extending tunnel, carriers for supporting the clay ware movable longitudinally through the tunnel from one end thereof to the other, a heat inlet conduit formed in the upper part of said tunnel and extending longitudinally of said tunnel through the greater portion of the length of the latter, said conduit being disposed above the ware settings contained on said carriers, means for delivering a heated gaseous fluid to one end of said conduit and adjacent to the carrier outlet end of the tunnel, said conduit being provided with spaced heat outlet passages which provide for the passage of the heated fluid substantially downwardly into the tunnel for direct contact with the ware being heated, exhaust conduits extending longitudinally of the tunnel and arranged on opposite sides of the heat delivering conduit, said exhaust conduits being provided with inlet portions arranged adjacent to the side walls of the tunnel and terminating below the inlet passages of said first named conduit, and an outlet communicating with the discharge ends of the exhaust conduits, said outlet being situated adjacent to the carrier inlet end of the tunnel.

2. A drier for clay ware comprising a wall structure formed to embody an elongated longitudinally extending tunnel, a conduit arranged centrally of said tunnel adjacent to the roof structure thereof and extending longitudinally of the tunnel throughout the major portion of the length of the latter, conveying means for supporting clay ware movable longitudinally through the tunnel from one end of the latter to the other beneath said conduit, means arranged at the ware discharge end of the tunnel for positively introducing a heated gaseous fluid into said conduit for travel through the latter, the lower portion of said conduit being provided with passages for effecting the downflow of said heated fluid into said tunnel and into direct contact with the ware mounted on said conveying means, an exhaust conduit extending longitudinally of said tunnel and arranged adjacent to and parallel with said inlet conduit, and a longitudinally extending apron depending from said exhaust conduit and spaced from one of the side walls of the tunnel and serving to provide an air inlet passage between substantially the lower portions of the tunnel and said exhaust conduit, whereby the heated gaseous fluid entering the tunnel from the inlet conduit passes substantially downwardly across the ware and then laterally and horizontally before entering the exhaust conduit.

3. A drier for clay ware comprising a wall structure formed to include an elongated longitudinally extending tunnel, conveying means movable longitudinally through the tunnel and adapted for the reception of clay ware to be heat treated, a conduit arranged in the top of said tunnel and above the ware supported on said conveying means, said conduit extending substantially throughout the major portion of the length of said tunnel, means for positively delivering to the end of said conduit situated adjacent to the ware outlet end of the tunnel a heated gaseous fluid, the lower portion of said conduit being perforated at longitudinal intervals to permit said fluid to flow downwardly upon entering the tunnel and into direct contact with the ware, a pair of exhaust conduits extending longitudinally of said tunnel and arranged on opposite sides of the inlet conduit, said exhaust conduits being provided with longitudinally extending depending aprons spaced from the adjacent walls of said tunnel and open at their lower ends in planes materially below said inlet conduit, whereby the heated fluid entering said tunnel passes downwardly through said ware and then outwardly and laterally into the entrance portions of the exhaust conduits, and an outlet communicating with the discharge ends of said exhaust conduits, said outlet being disposed adjacent to the ware inlet end of the tunnel.

4. A drier for clay ware comprising a wall structure formed to provide an elongated longitudinally extending tunnel, conveying means for passing clay ware longitudinally through said tunnel from one end of the latter to the other, a longitudinally extending heat supply conduit arranged centrally in the roof of the tunnel, said conduit being provided with outlets in the lower wall thereof, means for delivering a heated gaseous fluid to said conduit to effect the forced passage thereof through said outlets and downwardly of the tunnel through and around the ware disposed on the conveying means, a pair of longitudinally extending exhaust conduits arranged substantially in the horizontal plane of said supply conduit and disposed on opposite sides of the latter, and partition means extending parallel with and spaced from the side walls of said tunnel to provide passages for the withdrawal of moisture laden air from the lower portion of said tunnel and delivering such air to the elevated exhaust conduits for removal from the drier.

5. A drier for clay ware comprising a wall structure formed to provide an elongated longitudinally extending tunnel, conveying means for passing clay ware longitudinally through the tunnel from one end of the latter to the other, a longitudinally extending heat supply conduit arranged in the roof of the tunnel and provided with outlets in the lower wall thereof, means for delivering a heated gaseous fluid to said conduit to effect the forced passage thereof through said outlets and downwardly into said tunnel through and around the ware disposed on the conveying means, an exhaust conduit arranged in the roof of said tunnel and provided with branches disposed substantially in the same plane and on opposite sides of the heat supply conduit, and vertically arranged wall members extending longitudinally and spaced from the sides of the tunnel to provide passages for withdrawing moisture laden air from the lower portion of said tunnel and delivering the same to the exhaust conduit and its branches for removal from the drier.

6. A drier for clay ware comprising a wall structure formed to provide an elongated longitudinally extending tunnel, conveying means for passing clay ware longitudinally through the tunnel from one end of the latter to the other, a longitudinally extending heat supply conduit arranged in the roof of the tunnel and provided with outlets in the lower portion thereof, means for delivering a heated gaseous fluid to said conduit to effect the forced passage of said fluid through said outlets and downwardly and around the ware disposed on the conveying means, a longitudinally extending exhaust conduit arranged substantially in the horizontal plane of said supply conduit and disposed at one side of the latter, and a longitudinally extending vertical wall arranged parallel to and spaced from each side of the tunnel and terminating above the floor of the latter for forming passages for the withdrawal of the moisture laden air from the lower portion of said tunnel and delivering the same to the relatively elevated exhaust conduit for removal from the drier.

7. A drier for clay ware comprising a wall structure formed to provide an elongated longitudinally extending tunnel, conveying means for passing clay ware longitudinally through the tunnel from one end of the latter to the other, a longitudinally extending heat supply conduit arranged centrally in the roof of the tunnel and extending substantially throughout the major portion of the length of said tunnel, the lower wall of said conduit being provided with perforations, means for delivering a heated gaseous fluid to said conduit to effect the forced passage of said fluid through said perforations and downwardly through the tunnel around the ware disposed on the conveying means, an exhaust conduit arranged in the roof of said tunnel beyond said supply conduit, said exhaust conduit being provided with a pair of longitudinally extending branches arranged in the same plane and on opposite sides of the heat supply conduit, the lower walls of said exhaust conduit and branches being provided with openings, and a pair of depending aprons extending parallel with and spaced from the sides of said tunnel, said aprons serving for the withdrawal of moisture laden air from the lower portion of said tunnel and the delivering of such air through said openings to the elevated exhaust conduit and its branches throughout the length of the tunnel.

In testimony whereof I affix my signature.
T. WALTER GARVE.